(12) United States Patent
Park et al.

(10) Patent No.: US 8,390,673 B2
(45) Date of Patent: Mar. 5, 2013

(54) METHOD OF CONTROLLING MONITORING CAMERA AND APPARATUS FOR CONTROLLING MONITORING CAMERA BY USING THE METHOD

(75) Inventors: Joon-young Park, Changwon (KR); Myung-seok An, Changwon (KR); Jong-seo Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 767 days.

(21) Appl. No.: 12/560,574

(22) Filed: Sep. 16, 2009

(65) Prior Publication Data

US 2010/0134591 A1 Jun. 3, 2010

(30) Foreign Application Priority Data

Dec. 2, 2008 (KR) .................. 10-2008-0121283

(51) Int. Cl.
*H04N 7/00* (2006.01)

(52) U.S. Cl. ............ 348/36; 348/E7.085; 348/143; 348/135; 382/190

(58) Field of Classification Search ............ 348/36, 348/143, 135, E7.085; 382/190
See application file for complete search history.

(56) References Cited

U.S. PATENT DOCUMENTS

| | | | | |
|---|---|---|---|---|
| 6,654,019 B2 * | 11/2003 | Gilbert et al. | .................. | 345/474 |
| 6,891,561 B1 * | 5/2005 | Achituv et al. | .................. | 348/36 |
| 7,085,435 B2 * | 8/2006 | Takiguchi et al. | ............ | 382/294 |
| 7,136,096 B1 * | 11/2006 | Yamagishi et al. | ......... | 348/218.1 |
| 7,221,401 B2 * | 5/2007 | Hama et al. | .................... | 348/369 |
| 7,286,722 B2 * | 10/2007 | Fujimoto et al. | .............. | 382/305 |
| 7,428,345 B2 * | 9/2008 | Caspi et al. | .................... | 382/294 |
| 7,768,545 B2 * | 8/2010 | Glatt | .............................. | 348/36 |
| 8,044,992 B2 * | 10/2011 | Kurebayashi et al. | .......... | 348/36 |
| 8,077,213 B2 * | 12/2011 | Gulliksson | ................. | 348/218.1 |
| 2002/0171736 A1 * | 11/2002 | Gutta et al. | ................... | 348/143 |
| 2002/0175994 A1 * | 11/2002 | Sakakibara et al. | .......... | 348/135 |
| 2006/0020990 A1 * | 1/2006 | McEneaney | ................. | 725/105 |
| 2006/0210263 A1 * | 9/2006 | Oh | ................................ | 396/287 |
| 2007/0173689 A1 * | 7/2007 | Ozaki et al. | .................... | 600/111 |
| 2008/0074489 A1 * | 3/2008 | Zhang et al. | .................... | 348/36 |
| 2008/0122922 A1 * | 5/2008 | Geng | ............................... | 348/39 |
| 2008/0129818 A1 * | 6/2008 | Miller | ............................ | 348/36 |
| 2008/0231717 A1 * | 9/2008 | Shioji et al. | ................ | 348/220.1 |
| 2008/0277585 A1 * | 11/2008 | Hasegawa et al. | ............ | 250/334 |
| 2009/0044151 A1 * | 2/2009 | Ichii et al. | ...................... | 715/854 |
| 2009/0160936 A1 * | 6/2009 | McCormack | ................. | 348/143 |
| 2009/0213209 A1 * | 8/2009 | Hasegawa et al. | .............. | 348/39 |
| 2010/0026822 A1 * | 2/2010 | Hahm et al. | ................ | 348/218.1 |
| 2010/0179691 A1 * | 7/2010 | Gal et al. | ...................... | 700/259 |
| 2010/0265331 A1 * | 10/2010 | Tanaka | .......................... | 348/159 |
| 2011/0102586 A1 * | 5/2011 | Yang et al. | .................... | 348/143 |
| 2011/0199461 A1 * | 8/2011 | Horio et al. | ...................... | 348/46 |

FOREIGN PATENT DOCUMENTS

| | | |
|---|---|---|
| JP | 2001-148850 A | 5/2001 |
| KR | 10-2005-0103597 A | 11/2005 |
| KR | 10-2008-0022838 A | 3/2008 |
| KR | 10-2008-0044936 A | 5/2008 |

* cited by examiner

*Primary Examiner* — Alina N. Boutah (74) *Attorney, Agent, or Firm* — Sughrue Mion, PLLC (57) ABSTRACT

Provided is a method of controlling a monitoring camera that performs panning, tilting, and zooming, the method including: generating a panoramic image file by controlling the monitoring camera to perform panning and tilting; and performing a setting operation in a user setting mode while displaying a panoramic image of the panoramic image file.

17 Claims, 7 Drawing Sheets

METHOD OF CONTROLLING MONITORING CAMERA AND APPARATUS FOR CONTROLLING MONITORING CAMERA BY USING THE METHOD

CROSS-REFERENCE TO RELATED PATENT APPLICATION

This application claims priority from Korean Patent Application No. 10-2008-0121283, filed on Dec. 2, 2008, in the Korean Intellectual Property Office, the disclosure of which is incorporated herein in its entirety by reference.

BACKGROUND

1. Field of the Invention

Methods and apparatuses consistent with the inventive concept relate to controlling a monitoring camera, and more particularly, to controlling a monitoring camera that performs panning, tilting, and zooming.

2. Description of the Related Art

Monitoring cameras may perform panning, tilting, and zooming according to control commands from a control apparatus, such as a computer. When panning is performed, a monitoring camera horizontally rotates, and when tilting is performed, a monitoring camera vertically rotates.

In this regard, an apparatus, such as a computer, for controlling at least one monitoring camera has a user setting mode that may include a private mask setting mode, an interest region setting mode, and a monitoring path setting mode, for a user.

In a private mask setting mode, a user may set at least one region that the user does not want to display. Here, the at least one region is then masked in a uniform color without being displayed.

In an interest region setting mode, a user may set at least one region that the user wants to monitor intensively. Here, if a single monitoring camera is used, the at least one region may be enlarged, or if a plurality of monitoring cameras are used, a monitoring camera monitoring the at least one region may be fixed while other monitoring cameras perform panning and tilting.

In a monitoring path setting mode, a user may set panning and tilting paths of a monitoring camera. Here, the monitoring camera performs panning and tilting according to a monitoring path along regions sequentially assigned by the user.

Accordingly, in the above-described user setting modes, the user may have to designate at least one region for the user setting modes only while panning and tilting is performed.

SUMMARY OF THE INVENTION

Exemplary embodiments provide a method and apparatus for controlling a monitoring camera, wherein a user easily designate at least one region to be set without having to pan and tilt the monitoring camera.

According to an exemplary embodiment, there is provided a method of controlling a monitoring camera that performs panning, tilting, and zooming, the method including: generating a panoramic image file by controlling the monitoring camera to perform panning and tilting; and performing a setting operation in a user setting mode while displaying a panoramic image of the panoramic image file.

According to another aspect of an exemplary embodiment, there is provided an apparatus for controlling a monitoring camera that performs panning, tilting, and zooming, wherein the apparatus uses the method.

According to the method and apparatus of the exemplary embodiments, the user setting mode may be performed while the panoramic image is displayed. Accordingly, at least one region to be designated may be easily assigned without performing panning and tilting.

BRIEF DESCRIPTION OF THE DRAWINGS

The above and other aspects will become more apparent by describing in detail exemplary embodiments with reference to the attached drawings, in which:

FIG. 8 is a diagram for describing points whereat events occurred, displayed in the order that the events occurred, in operation S210 of the method of FIG. 2, according to an exemplary embodiment; and.

DETAILED DESCRIPTION OF EXEMPLARY EMBODIMENTS

Hereinafter, the present invention will be described more fully with reference to the accompanying drawings, in which exemplary embodiments are shown.

Figure 1:
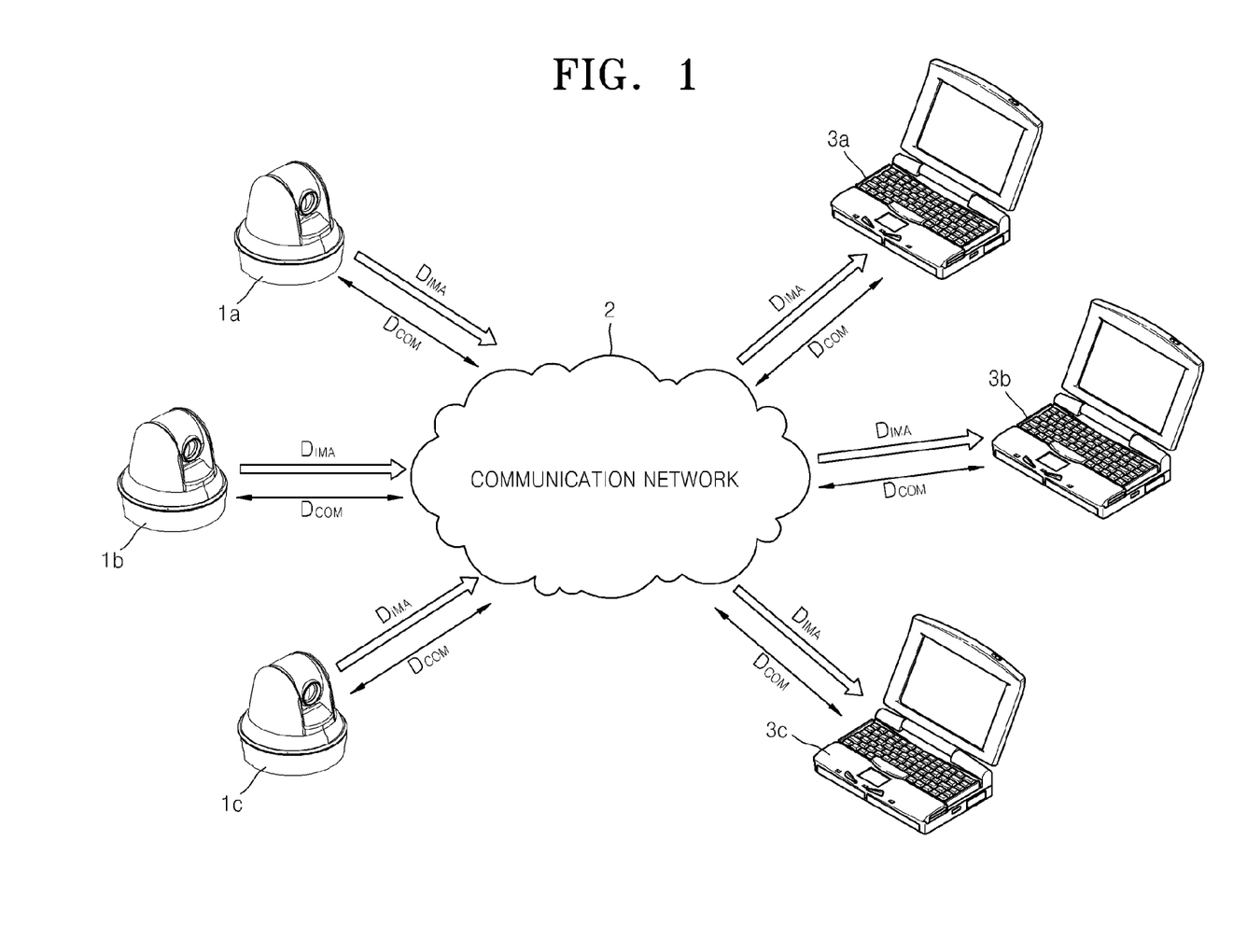
FIG. 1 is a diagram illustrating computers as apparatuses for controlling monitoring cameras, according to an exemplary embodiment, and illustrates the computers communicating with the monitoring cameras through a communication network.

FIG. 1 is a diagram illustrating computers 3*a*, 3*b*, and 3*c* as apparatuses for controlling monitoring cameras 1*a*, 1*b*, and 1*c*, according to an exemplary embodiment, and illustrates the computers 3*a*, 3*b*, and 3*c* communicating with the monitoring cameras 1*a*, 1*b*, and 1*c* through a communication network 2.

Referring to FIG. 1, the monitoring cameras 1*a*, 1*b*, and 1*c* communicate with the computers 3*a*, 3*b*, and 3*c* via a communication channel $D_{COM}$, and transmit moving image data of a live-view image to the computers 3*a*, 3*b*, and 3*c* via an image data channel $D_{IMA}$.

The computer 3*a*, 3*b*, or 3*c* displays and stores a live-view image received from at least one of the monitoring cameras 1*a*, 1*b*, and 1*c*. Also, the computer 3*a*, 3*b*, or 3*c* monitors whether an event occurs by analyzing the moving image data, and stores image data, location information, and a user input log regarding the event occurrence.

The computer 3a, 3b, or 3c performs various operations in a user setting mode, a user memo mode, an event information display mode, or other modes according to input signals from a user.

Here, the computer 3a, 3b, or 3c controls at least one of the monitoring cameras 1a, 1b, and 1c to perform panning and tilting so as to generate a panoramic image file.

The computer 3a, 3b, or 3c performs a setting operation in the user setting mode while displaying a panoramic image of the panoramic image file. Accordingly, the user may easily designate at least one region on which the setting operation is to be performed in the user setting mode by using the panoramic image without having to pan and tilt the monitoring cameras 1a, 1b, and 1c.

The computer 3a, 3b, or 3c performs a user memo operation in the user memo mode while displaying the panoramic image of the panoramic image file. For example, if location data about a point or a region designated by the user is input in the user memo mode, the computer 3a, 3b, or 3c displays a memo window, the user inputs a memo into the memo window, and the computer 3a, 3b, or 3c stores the location data and the memo.

Therefore, a location related to the memo is immediately stored as compared to a related art user memo mode. In addition, the user reading the memo is able to immediately determine the location related to the memo.

Moreover, in the event information display mode, the computer 3a, 3b, or 3c displays event information while displaying the panoramic image of the panoramic image file.

Accordingly, the user is able to immediately determine a location where an event occurred as compared to a related art event information display mode.

The above aspects will now be described in detail with reference to FIGS. 2 through 8.

Figure 2:
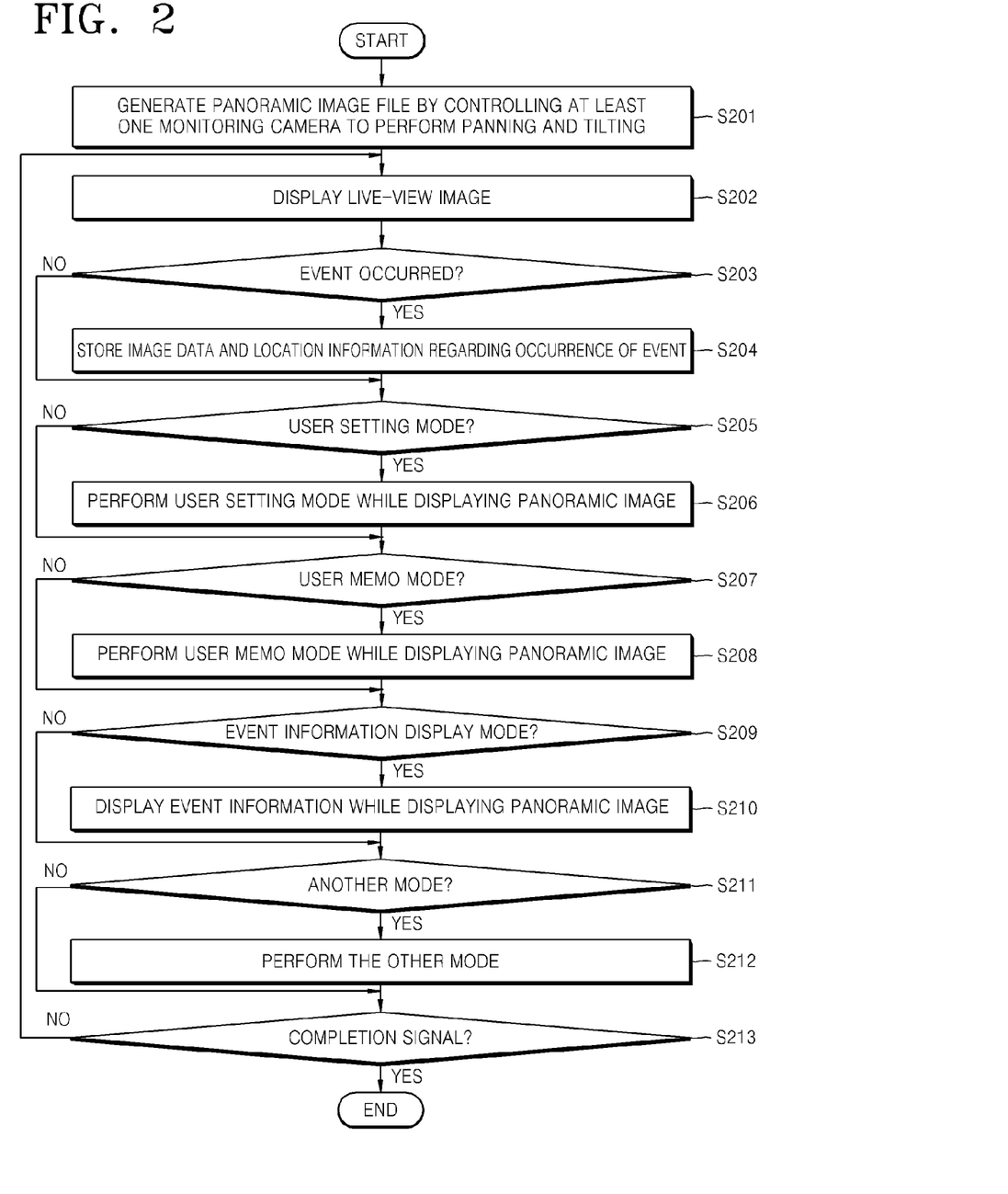
FIG. 2 is a flowchart illustrating a method of controlling at least one of the monitoring cameras of FIG. 1, according to an exemplary embodiment, wherein the method is performed by one of the computers of FIG. 1.
Figure 3:
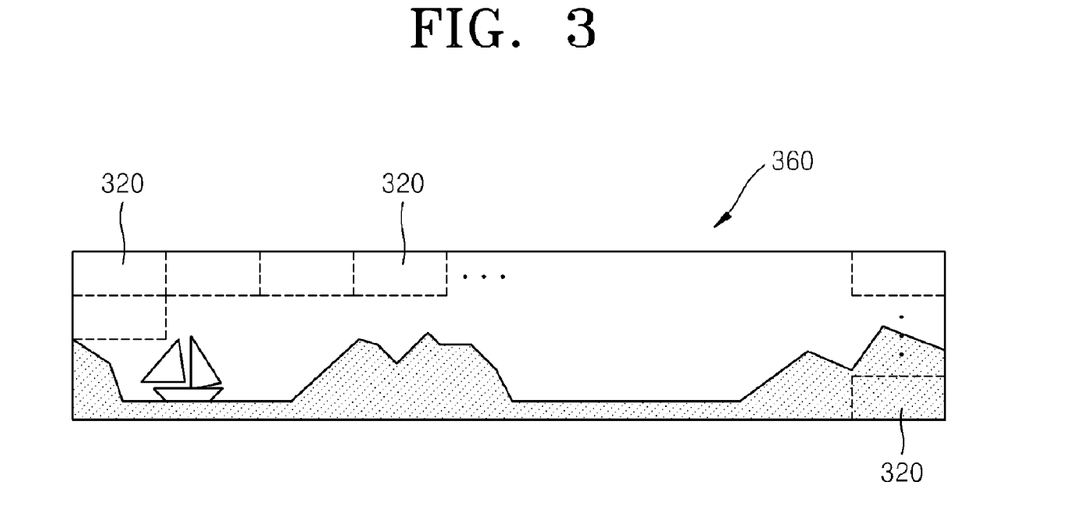
FIG. 3 is a diagram of a panoramic image of a panoramic image file generated in operation S201 of the method of FIG. 2, according to an exemplary embodiment.

FIG. 2 is a flowchart illustrating a method of controlling at least one of the monitoring cameras 1a, 1b, and 1c of FIG. 1, according to an exemplary embodiment, wherein the method is performed by one of the computers 3a, 3b, and 3c. FIG. 3 is a diagram of a panoramic image 360 of a panoramic image file generated in operation S201 of the method of FIG. 2, according to an exemplary embodiment. In FIG. 3, a reference numeral 320 denotes unit images. The method will now be described with reference to FIGS. 2 and 3.

First, the computer 3a, 3b, or 3c controls the at least one of the monitoring cameras 1a, 1b, and 1c to perform panning and tilting so as to generate a panoramic image file (operation S201).

Then, the computer 3a, 3b, or 3c displays a live-view image received from the at least one of the monitoring cameras 1a, 1b, and 1c(operation S202).

If an event related to monitoring occurs while displaying the live-view image (operation S203), the computer 3a, 3b, or 3c stores image data, location information, and a user input log regarding the event occurrence (operation S204).

Then, If a user setting mode is set according to an input signal from a user (operation S205), the computer 3a, 3b, or 3c performs a setting operation in the user setting mode while displaying the panoramic image 360 of the panoramic image file (operation S206). Accordingly, at least one region performed may be easily designated without having to pan and tilt the monitoring cameras 1a, 1b, and 1c. Further details will be described later with reference to FIGS. 4 through 6.

If a user memo mode is set according to an input signal from the user (operation S207), the computer 3a, 3b, or 3c performs a user memo operation in the user memo mode while displaying the panoramic image 360 of the panoramic image file (operation S208). For example, if location data about a point or a region designated by the user is input, a memo window is displayed, the user inputs a memo into the memo window, and then the location data and the memo are stored in the computer 3a, 3b, or 3c.

Accordingly, a location related to the memo is immediately stored as compared to a related art user memo mode. In addition, the user reading the memo is able to immediately determine the location related to the memo. This aspect will be described in detail later with reference to FIG. 7.

If an event information display mode is set according to an input signal from the user (operation S209), the computer 3a, 3b, or 3c displays event information while displaying the panoramic image 360 of the panoramic image file (operation S210).

Accordingly, the user is able to immediately determine the location of an event that occurred compared to a related art event information display mode. Details related to the above operations will be described later with reference to FIG. 8.

If another mode is set according to an input signal from the user (operation S211), the computer 3a, 3b, or 3c performs an operation corresponding to the other mode (operation S212).

If it is determined that a completion signal is not received (operation S213-No), operations S202 through S212 are performed again.

Figure 4:
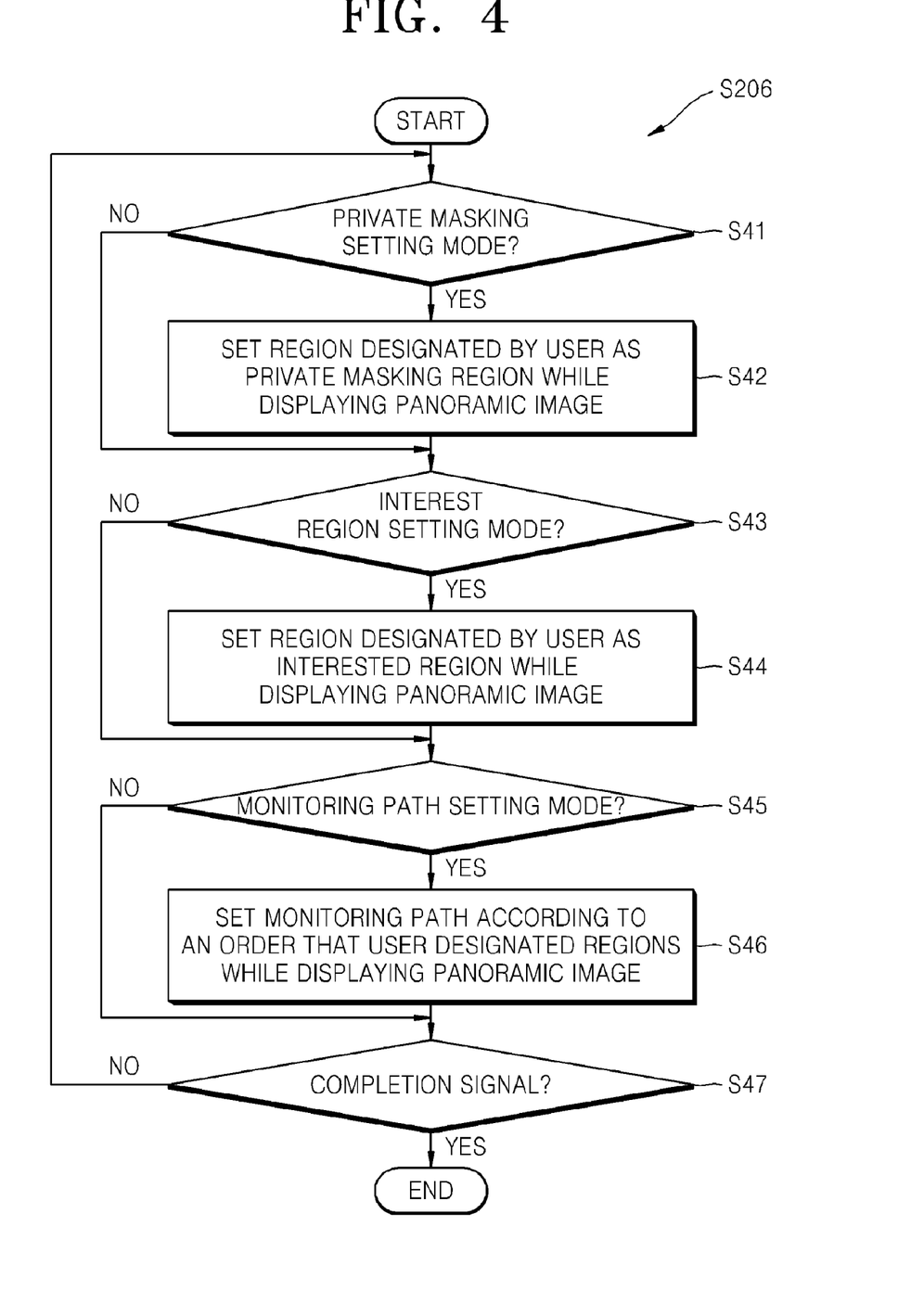
FIG. 4 is a flowchart illustrating a detailed method of performing a setting operation in a user setting mode in operation S206 of the method of FIG. 2, according to an exemplary embodiment.
Figure 5:
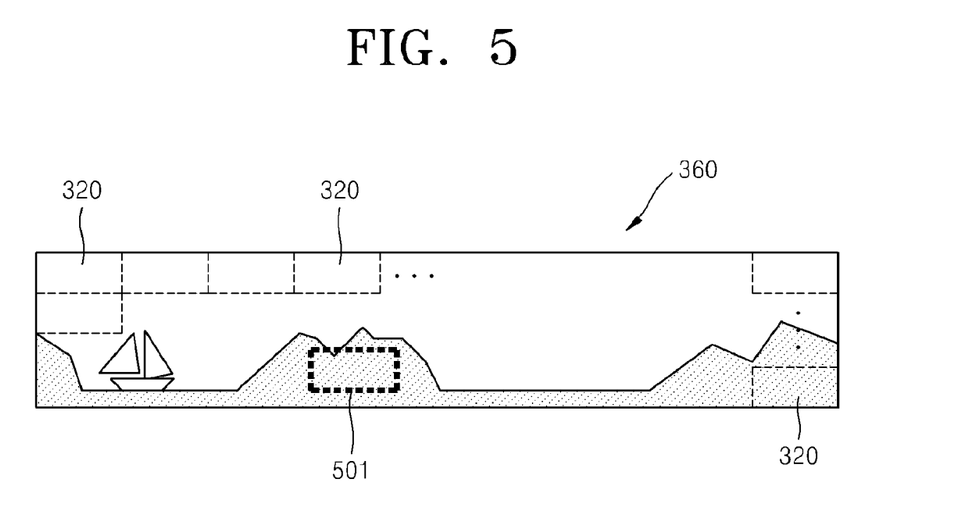
FIG. 5 is a diagram for describing a private mask region or an interest region designated by manipulating a pointer such as a mouse in operation S42 or S44 in the method of FIG. 4, according to an exemplary embodiment.
Figure 6:
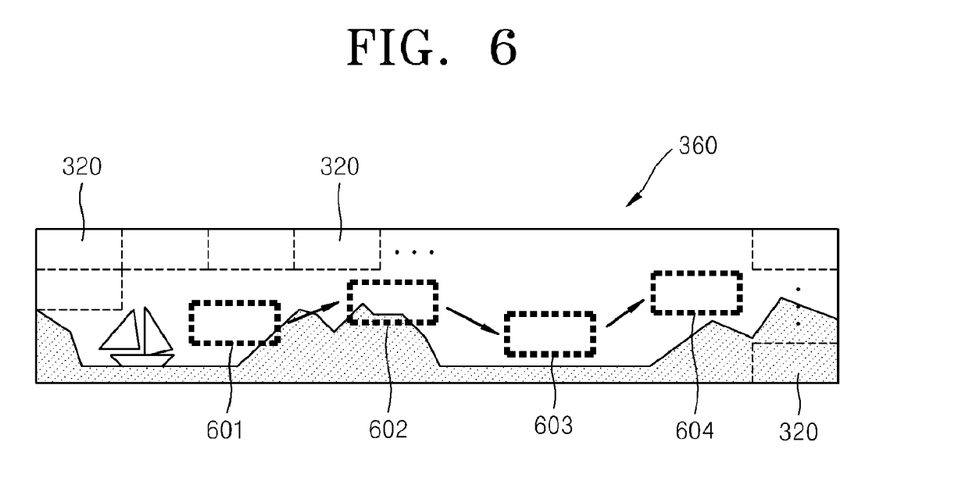
FIG. 6 is a diagram for describing a monitoring path along regions sequentially designated by manipulating a pointer such as a mouse in operation S46 in the method of FIG. 4, according to an exemplary embodiment.

FIG. 4 is a flowchart illustrating a detailed method of performing a setting operation in the user setting mode in operation S206 of the method of FIG. 2, according to an exemplary embodiment. FIG. 5 is a diagram for describing a private mask region or an interest region designated by manipulating a pointer such as a mouse in operation S42 or S44 in the method of FIG. 4, and FIG. 6 is a diagram for describing a monitoring path along regions 601 through 604 sequentially designated by manipulating a pointer device such as a mouse in operation S46 in the method of FIG. 4.

The detailed method of performing a setting operation in the user setting mode in operation S206 of the method of FIG. 2 will now be described with reference to FIGS. 4 through 6.

First, if a private mask setting mode is set according to an input signal from the user (operation S41), the computer 3a, 3b, or 3c sets a region 501 designated by the user as a private mask region while displaying the panoramic image 360 of the panoramic image file (operation S42).

Accordingly, the private mask region may be easily designated without having to pan and tilt the monitoring cameras 1a, 1b, and 1c. If the region 501 is set as the private mask region, then the region 501 is masked with a uniform color.

Next, if an interest region setting mode is set according to an input signal from the user (operation S43), the computer 3a, 3b, or 3c sets the region 501 as an interest region while displaying the panoramic image 360 (operation S44).

Accordingly, the interest region may be easily designated without having to pan and tilt the monitoring cameras 1a, 1b, and 1c. If the region 501 is designated as the interest region and only one of the monitoring cameras 1a, 1b, and 1c is used, the region 501 may be enlarged, or if the region 501 is designated as the interest region and more than one of the monitoring cameras 1a, 1b, and 1c are used, a monitoring camera monitoring the region 501 is fixed while other monitoring cameras perform panning and tilting.

If a monitoring path setting mode is set according to an input signal from the user (operation S45), the computer 3a, 3b, or 3c designates a monitoring path along the regions 601 through 604 according to the user's order setting the regions 601 through 604 as the monitoring path while displaying the panoramic image 360 (operation S46).

Accordingly, the monitoring path may be easily designated without having to pan and tilt the monitoring cameras 1a, 1b, and 1c. When the monitoring path is designated, the at least one of the monitoring cameras 1a, 1b, and 1c performs panning and tilting according to the monitoring path along the regions 601 through 604 sequentially designated by the user.

If it is determined that a completion signal is not received (operation S47-No), operations S41 through S46 are performed again.

Figure 7:
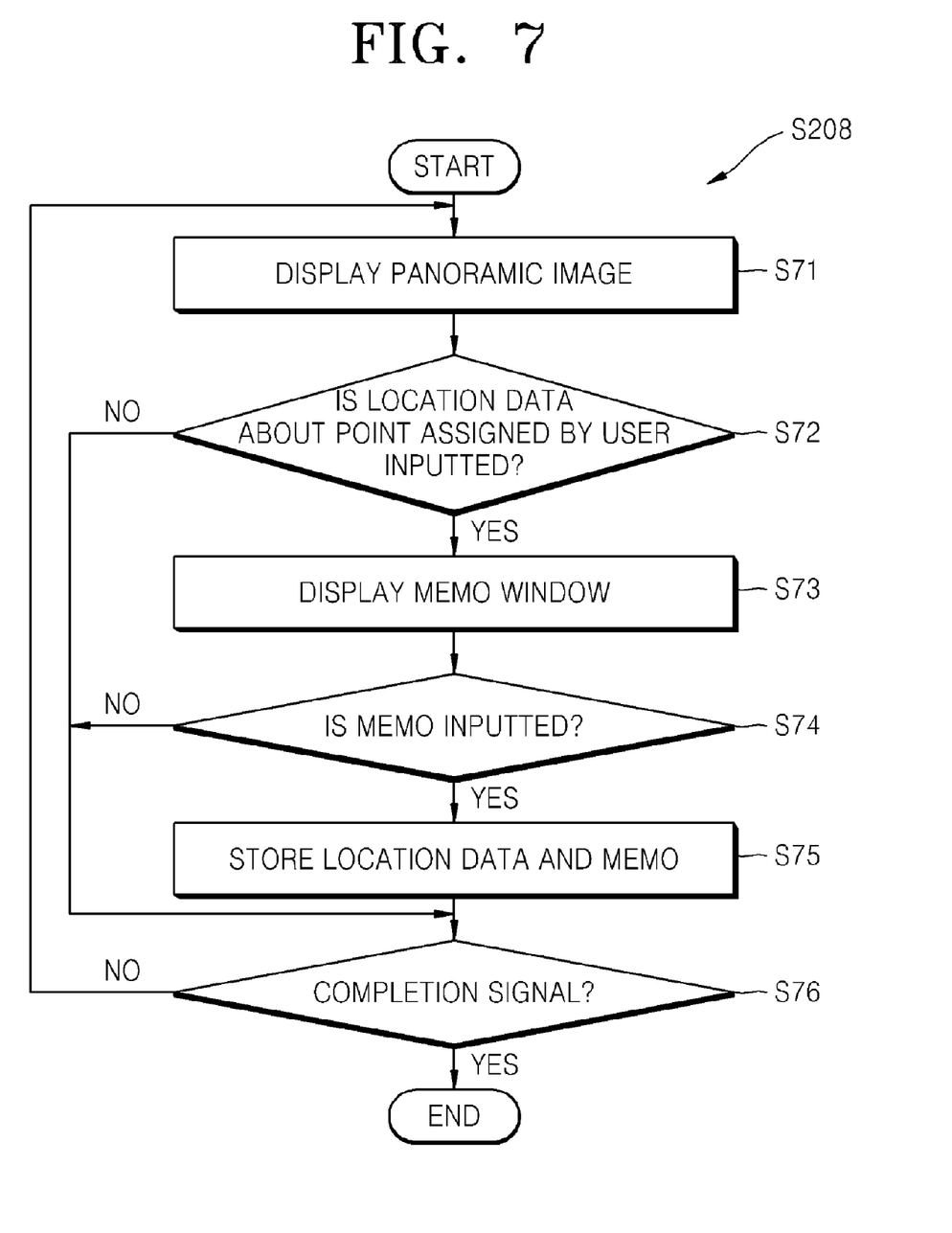
FIG. 7 is a flowchart illustrating a detailed method of performing a user memo mode in operation S208 of the method of FIG. 2, according to an exemplary embodiment.

FIG. 7 is a flowchart illustrating a detailed method of performing the user memo mode in operation S208 of the method of FIG. 2, according to an exemplary embodiment.

First, the computer 3a, 3b, or 3c displays the panoramic image 360 of FIG. 3 of the panoramic image file (operation S71).

Then, if location data of a point or a region designated by the user is input (operation S72), the computer 3a, 3b, or 3c displays a memo window (operation S73).

If the user inputs a memo into the memo window (operation S74), the computer 3a, 3b, or 3c stores the location data and the memo (operation S75).

Then, if it is determined that a completion signal is not received (operation S76-No), operations S71 through S75 are performed again.

Accordingly, a location related to the memo may be immediately stored as compared to a related art user memo mode. Also, the user reading the memo is able to immediately determine the location related to the memo.

Figure 8:
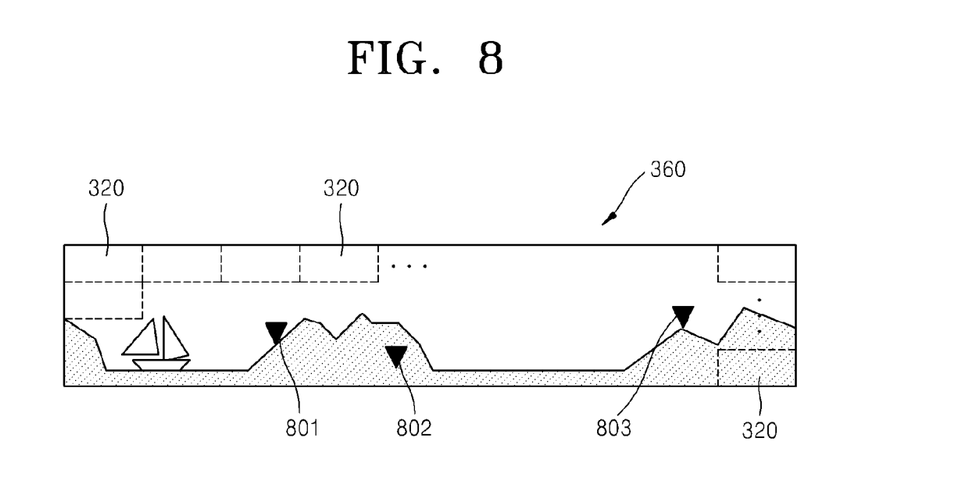

FIG. 8 is a diagram for describing points 801 through 803 whereat events occurred, displayed in the order that the events occurred, in operation S210 of the method of FIG. 2, according to an exemplary embodiment.

Referring to FIG. 8, the points 801 through 803 whereat the events occurred are displayed in the order that the events occurred in the event information display mode of operation S210 of FIG. 2. For example, the user input log is displayed while the points 801 through 803 flicker in the order that the events occurred.

Accordingly, the user is able to immediately determine the points 801 through 803 whereat the events occurred, compared to a related art event information display mode.

As described above, according to the method and apparatus for controlling a monitoring camera of the exemplary embodiments, the user setting mode is performed while the panoramic image is displayed. Accordingly, the user may easily designate at least one region to be set without having to pan and tilt the monitoring cameras.

In addition, the user memo mode is performed while displaying the panoramic image of the panoramic image file. Accordingly, the location related to the memo may be immediately stored compared to a related art user memo mode. Also, the user reading the memo is able to immediately determine the location related to the memo.

Moreover, in the event information display mode, the event information is displayed while displaying the panoramic image of the panoramic image file. Accordingly, the user is able to immediately determine a location where an event occurred as compared to a related art event information display mode.

Figure 9:
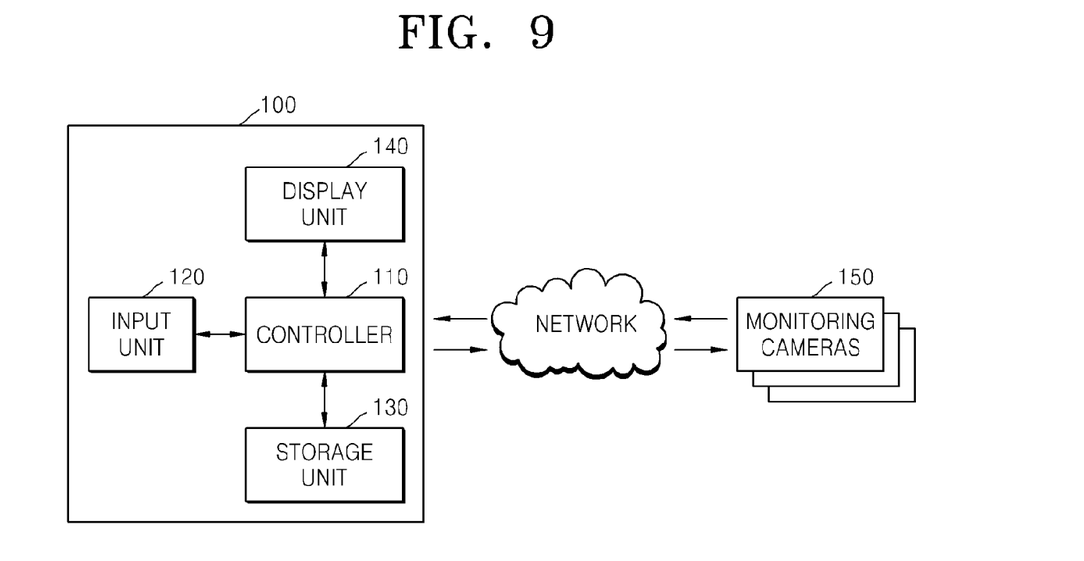
FIG. 9 is a diagram illustrating a structure of an apparatus for controlling the monitoring cameras 1*a*, 1*b* and/or 1*c* as shown in FIG. 1, according to an exemplary embodiment.

FIG. 9 is a diagram illustrating a structure of an apparatus 100 for controlling the monitoring cameras 1a, 1b and/or 1c as shown in FIG. 1, according to an exemplary embodiment. The apparatus 100 may be implemented by any of the computers 3a, 3b and/or 3c as shown in FIG. 1 or a separate device.

Referring to FIG. 9, the apparatus 100 includes a controller 110, an input unit 120, a storage unit 130 and a display unit 140. The apparatus 100 may constituted only by the controller 110, in which case the input unit 120, the storage unit 130 and the display unit 140 may be implemented as separate units, respectively. The controller 110 generates a panoramic image file by controlling monitoring cameras 150 to perform panning and tilting. To generate the panoramic image file, the controller 110 may receive image data obtained by the monitoring cameras 150 that perform the panning and tilting. The image data received at the controller 110 may be stored in a storage unit 130. The controller 110 generates a panoramic image file from the image data received from the monitoring cameras 150 or stored in the storage unit 130. The panoramic image file is used to generate a corresponding panoramic image. The panoramic image may include all the image data obtained by the monitoring camera at a given time to cover an entire area that the monitoring camera is set to monitor, or a portion of the entire area.

Further, when the input unit 120 receives a user input to set the controller 110 to a user setting mode, the controller 110 is ready to perform various setting operations in the user setting mode. The various setting operations may include a monitoring camera setting operation. When the input unit 120 receives a user input with respect to a particular setting operation in the user setting mode, the controller 110 performs the setting operation. For this setting operation, the controller may use the panoramic image generated based on the panoramic image file to designate at least one region covered by the panoramic image. Accordingly, a user may not have to pan and tilt the monitoring cameras 150 to designate the at least one region in the user setting mode.

The term "unit", as used herein, indicates, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more computers in a communication system While the exemplary embodiments have been particularly shown and described, it will be understood by those of ordinary skill in the art that various changes in form and details may be made therein without departing from the spirit and scope of the inventive concept as defined by the following claims.

What is claimed is:

1. A method of controlling a monitoring camera, the method comprising:
    generating a panoramic image by controlling the monitoring camera to perform panning and tilting; and
    performing a setting operation in a user setting mode, using the panoramic image so that a user setting is indicated on the panoramic image, wherein the performing the setting operation comprises indicating a monitoring path along regions designated by a user on the panoramic image if a monitoring path setting mode is set, and wherein the performing the setting operation further comprises displaying on the panoramic image points at which an event occurs or has occurred, in an event information display mode.

2. The method of claim 1, wherein the panoramic image is an image that covers an entire area that the monitoring camera is set to monitor.

3. The method of claim 1, wherein, in the performing the setting operation in the user setting mode, if an interest region setting mode that designates an interest region of a user is set, a region designated by the user is set as an interest region by using the panoramic image.

4. The method of claim 1, further comprising controlling the monitoring camera or another monitoring camera to monitor the regions designated by the user through at least one of panning and tilting, according to the setting operation.

5. The method of claim 1, further comprising performing a user memo operation in a user memo mode by using the panoramic image.

6. The method of claim 5, wherein the performing the user memo operation in the user memo mode comprises:
   displaying the panoramic image;
   displaying a memo window if location data of a point designated by a user is input; and
   if the user inputs a memo into the memo window, storing the location data and the memo.

7. The method of claim 1, wherein image data, location information, and a user input log regarding occurrence of an event are stored while displaying a live-view image of a region that the monitoring camera or another monitoring camera monitors.

8. The method of claim 1, wherein the points at which the event has occurred are displayed in an order that the events occurred.

9. The method of claim 1, wherein the points at which the event occurs or has occurred flicker on the panoramic image.

10. An apparatus for controlling a monitoring camera, the apparatus comprising:
   a controller that generates a panoramic image in a display unit by controlling the monitoring camera to perform panning and tilting, and performs a setting operation in a user setting mode using the panoramic image so that a user setting is indicated on the panoramic image;
   an input unit that receives a user input related to the setting operation, wherein if an event information display mode is set through the input unit, the controller controls to display on the panoramic image file points at which an event occurs has occurred.

11. The apparatus of claim 10,
   wherein the controller controls to indicate a monitoring path along regions sequentially designated by a user on the panoramic image if a monitoring path setting mode is set according to the setting operation.

12. The apparatus of claim 10, wherein the panoramic image is an image that covers an entire region that the monitoring camera is set to monitor.

13. The apparatus of claim 10, wherein, in the performing the setting operation in the user setting mode, if an interest region setting mode that designates an interest region of a user is set through the input unit, the controller sets a region designated by the user as an interest region by using the panoramic image.

14. The apparatus of claim 11, wherein according to the setting operation, the controller controls the monitoring camera or another monitoring camera to monitor the regions designated by the user through at least one of panning and tilting, according to the setting operation.

15. The apparatus of claim 10, wherein the controller further performs a user memo operation in a user memo mode by using the panoramic image.

16. The apparatus of claim 15, wherein, in the performing the user memo operation in the user memo mode, the controller:
   displays the panoramic image on the display unit;
   displays a memo window on the display unit if location data of a point designated by a user is input to the input unit; and
   if the user inputs a memo into the memo window through the input unit, stores the location data and the memo in the storage unit.

17. The apparatus of claim 11, wherein the controller stores in the storage unit image data, location information, and a user input log regarding occurrence of an event while displaying on the display unit a live-view image of a region that the monitoring camera or another monitoring camera monitors.

* * * * *